United States Patent
Huang et al.

(10) Patent No.: US 7,860,612 B2
(45) Date of Patent: Dec. 28, 2010

(54) CONTROLLING MACHINE ACTIONS BASED ON LUMINANCE OF ENVIRONMENTAL LIGHT AND DISTANCE FROM USER

(75) Inventors: Yen-Ju Huang, Taipei Hsien (TW);
Wei-Nan William Tseng, Taipei (TW);
Cheng-Te Tseng, Taipei (TW); Hung-Yi Chen, Hsin-Chu (TW)

(73) Assignee: Qisda Corporation, Taoyuan County (TW)

( * ) Notice: Subject to any disclaimer, the term of this patent is extended or adjusted under 35 U.S.C. 154(b) by 0 days.

(21) Appl. No.: 12/823,141

(22) Filed: Jun. 25, 2010

(65) Prior Publication Data

US 2010/0262284 A1    Oct. 14, 2010

Related U.S. Application Data

(62) Division of application No. 11/276,321, filed on Feb. 24, 2006, now Pat. No. 7,783,382.

(51) Int. Cl.
*G06F 19/00* (2006.01)

(52) U.S. Cl. ..................................... 700/245

(58) Field of Classification Search .................. 700/245, 700/255, 259, 275; 382/118, 153
See application file for complete search history.

(56) References Cited

U.S. PATENT DOCUMENTS

| 6,819,978 | B2 | 11/2004 | Funada |
| 7,532,743 | B2 | 5/2009 | Morisada |
| 2006/0184274 | A1 | 8/2006 | Sakai |

FOREIGN PATENT DOCUMENTS

| TW | 581959 | 4/2004 |
| TW | 592777 | 6/2004 |
| TW | I242701 | 11/2005 |

*Primary Examiner*—Kim T Nguyen

(57) ABSTRACT

A control system for controlling actions performed by a machine includes a sensor module for sensing environmental condition around the machine, an estimation unit for estimating the environmental condition detected by the sensor, a motor for controlling movement of the machine, a control unit for calculating a magnitude of motion according to the estimated environmental condition, the magnitude of motion used for controlling the movement of the machine, and a motor drive circuit for driving the motor to move the machine using the calculated magnitude of motion.

7 Claims, 3 Drawing Sheets

Page 1

CONTROLLING MACHINE ACTIONS BASED ON LUMINANCE OF ENVIRONMENTAL LIGHT AND DISTANCE FROM USER

CROSS REFERENCE TO RELATED APPLICATIONS

This is a division application of Ser. No. 11/276,321, now pending, filed on Feb. 24, 2006.

BACKGROUND OF THE INVENTION

1. Field of the Invention

The present invention relates to a control system for controlling actions of a machine, and more specifically, to controlling actions of the machine according to the luminance of environmental light and the distance between the machine and a user.

2. Description of the Prior Art

Robots often contain a display unit such as a liquid crystal display (LCD) or one or more light emitting diodes (LEDs) for expressing its current state to the user of the robot. In addition, robots can also use movement to indicate their mood or their status to the user. The user can recognize these actions, and thereby know how he should interact with the robot. Each action performed by the robot requires some source of power, such as battery power. However, if the robot is programmed to perform the same actions in all situations, more power is consumed since the robot cannot utilize any kind of power saving mode.

SUMMARY OF THE INVENTION

It is therefore an objective of the claimed invention to provide a control system for controlling actions performed by a machine or a robot in order to solve the above-mentioned problems.

According to an embodiment of the claimed invention, a control system for controlling actions performed by a machine includes a sensor module for sensing environmental condition around the machine, an estimation unit for estimating the environmental condition detected by the sensor, a motor for controlling movement of the machine, a control unit for calculating a magnitude of motion according to the estimated environmental condition, the magnitude of motion used for controlling the movement of the machine, and a motor drive circuit for driving the motor to move the machine using the calculated magnitude of motion.

According to another embodiment of the present invention, a control system for controlling actions performed by a robot includes a plurality of light sensors for measuring environmental light around the robot, a luminance estimation unit for estimating the luminance of the environmental light detected by the plurality of light sensors, and a control unit for calculating an expression factor used for controlling the expression of the robot according to the estimated luminance of the environmental light.

According to yet another embodiment of the present invention, a control system for controlling actions performed by a robot includes an image capturing device for capturing images of a user of the robot, a face detection unit for detecting the face of the user in the captured images, a distance estimating unit for estimating the distance between the robot and the user according to the size of the user's face in the captured images, and a control unit for calculating an expression factor used for controlling the expression of the robot according to the estimated distance between the robot and the user.

These and other objectives of the present invention will no doubt become obvious to those of ordinary skill in the art after reading the following detailed description of the preferred embodiment that is illustrated in the various figures and drawings.

DETAILED DESCRIPTION

The present invention offers methods for saving power in a robot or other types of machines that can be controlled. Some criteria are used for judging how to control the robot's actions. In addition, the robot can be controlled in different ways.

The basic concept of method and apparatus of the present invention is to have a machine automatically adjust its reactions/expressions according to certain environmental conditions. Environmental conditions such as environmental luminance, user distance, environmental sound volume, or certain conditions set by user preference, are examples in the present invention. Furthermore, machines applied in present invention can be a robot, an intellectual household appliance, or other types of electronic devices that need auto adjustments according to environmental conditions.

Figure 1:
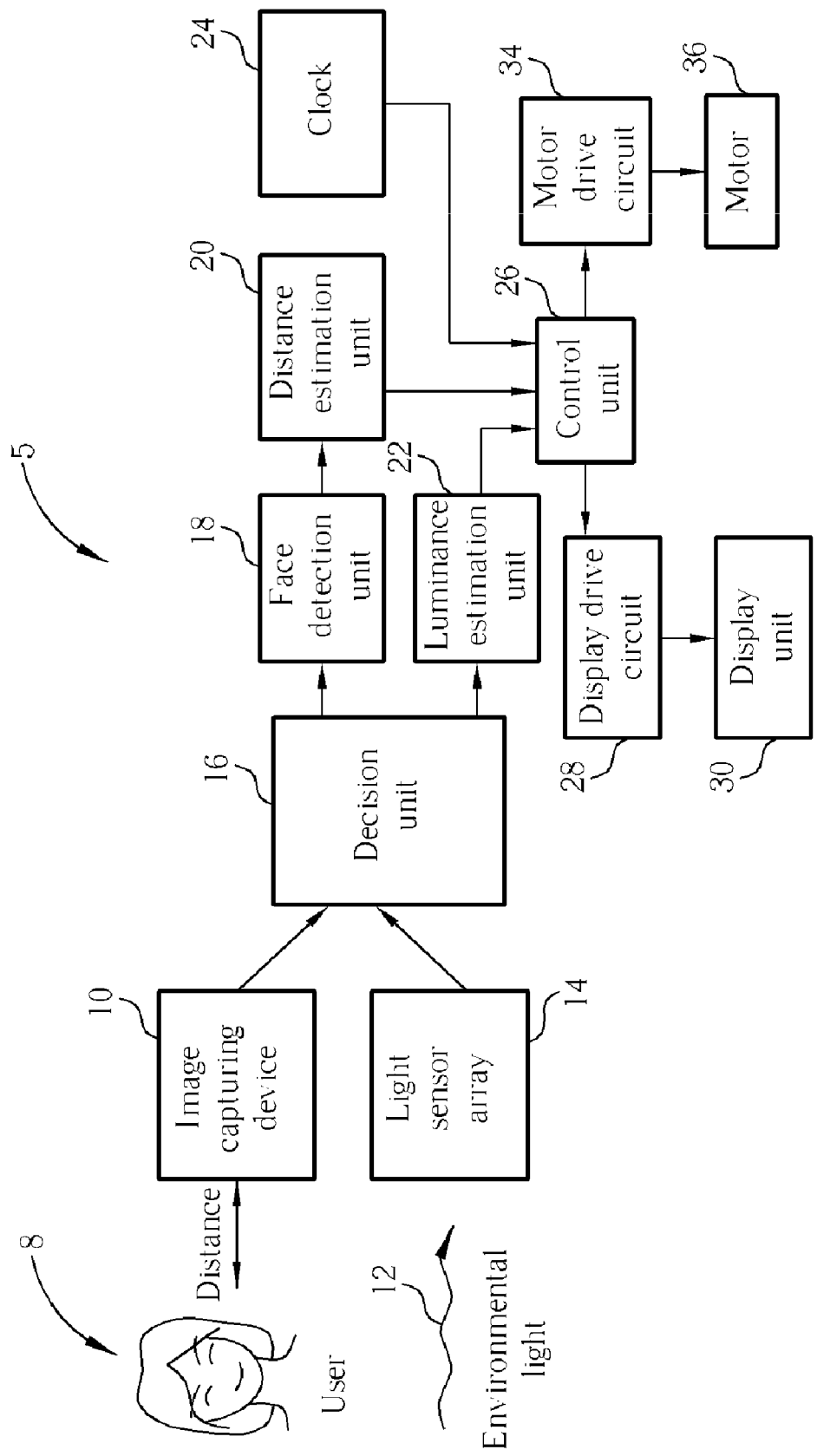
FIG. 1 is a block diagram of a control system according to the present invention.
Figure 2:
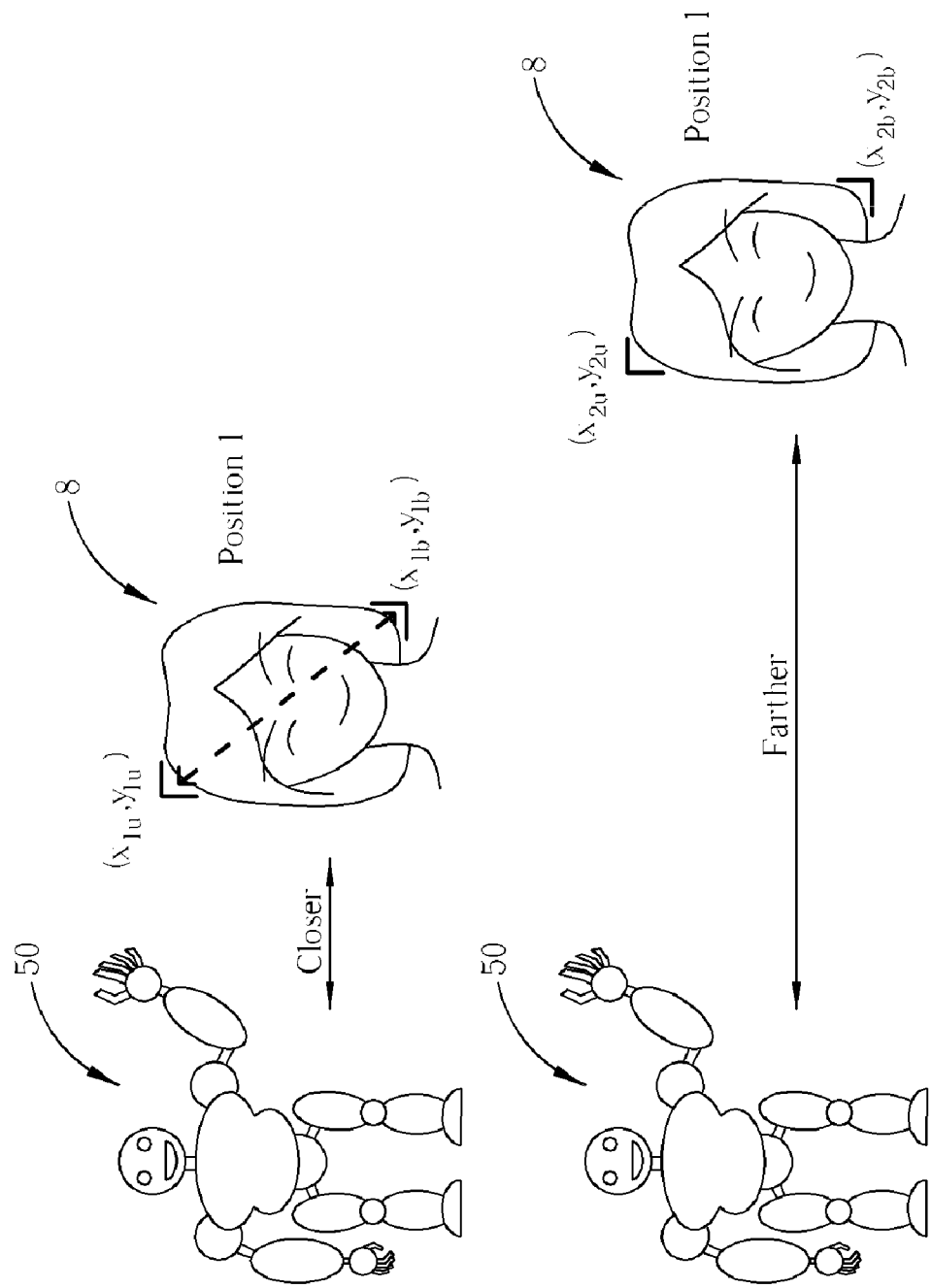
FIG. 2 is a diagram showing capturing images of a user for estimating the distance between the user and a robot.

Please refer to FIG. 1 and FIG. 2. FIG. 1 is a block diagram of a control system 5 according to the first embodiment of the present invention. The first criterion used for the robot 50 to judge how to control itself is by estimating the distance between the user 8 and the robot 50. FIG. 2 is a diagram showing capturing images of a user 8 for estimating the distance between the user 8 and a robot 50. To accomplish this, an image capturing device 10 is used to capture images of the user 8. The captured images are sent to a face detection unit 18 through a decision unit 16, and the face detection unit 18 detects the presence of registered user's faces in the captured images. If the face of a registered user is found in the captured images, the results are outputted to a distance estimation unit 20, which judges the distance between the robot 50 and the user 8 based on the size of the user's face in the captured images. If the captured images only contain the faces of unregistered users, the control system 5 may choose to ignore these faces, according to user preferences. The image capturing device 10 may be a CMOS or a CCD camera, for instance.

As shown in FIG. 2, two different positions of the user 8 are shown. The user 8 is closer to the robot 50 in the first position than the second. The face detection unit 18 takes the images provided by the image capturing device 10 and measures the coordinates of the corners of the user's head. For instance, in the first position, the upper left corner has the coordinates of $(x_{1u}, y_{1u})$ and the lower right corner has the coordinates of $(x_{1b}, y_{1b})$. Please note that the present invention is not restricted to the use of just the upper left and lower right corners. In the second position, the upper left corner has the coordinates of $(x_{2u}, y_{2u})$ and the lower right corner has the coordinates of $(x_{2b}, y_{2b})$. The face detection unit 18 provides the coordinates of the user's face to the distance estimation unit 20.

Before being able to accurately calculate the distance between the robot 50 and the user 8, the distance estimation unit 20 must be calibrated. One way to calibrate the distance estimation unit 20 is to have the user 8 stand at a focal distance of the lens of the image capturing device 10 in order to get a reference distance of the user 8 that is matched with a diagonal distance across the user's face. Once the distance estimation unit 20 knows the reference distance, other distances can be calculated using Equation 1 below:

$$D_{new} = \frac{P_{refer}}{P_{new}} f_d \quad (1)$$

$$= \frac{(x_{refer\_u} - x_{refer\_b})^2 + (y_{refer\_u} - y_{refer\_b})^2}{(x_{new\_u} - x_{new\_b})^2 + (y_{new\_u} - y_{new\_b})^2} f_d$$

In Equation 1, $D_{new}$ is the estimated distance between the user 8 and the robot 50, $f_d$ represents the focal distance of the lens of the image capturing device 10, $P_{refer}$ represents for the reference position, $P_{new}$ represents the new position being measured, $(x_{refer\_u}, y_{refer\_u})$ and $(x_{refer\_b}, y_{refer\_b})$ represent the upper and bottom coordinates of the user's face at the reference position, and $(x_{new\_u}, y_{new\_u})$ and $(x_{new\_b}, y_{new\_b})$ represent the upper and bottom coordinates of the user's face at the new position. As will be explained below, this estimated distance $D_{new}$ is used to control the actions of the robot 50.

The second criterion used for judging how to control the robot 50 is by measuring the luminance of environmental light 12 around the robot 50 with a light sensor array 14. The light sensor array 14 preferably contains a plurality of light sensors, such as a set of 16 photo diodes or photo-transistors. The light sensor array 14 outputs the results to a luminance estimation unit 22 via the decision unit 16, where the luminance estimation unit 22 estimates the overall luminance of the environmental light 12. The overall luminance can be calculated by dividing the luminous flux measured by the light sensor array 14 by the area of the light sensor array 14. The decision unit 16 receives input from both the image capturing device 10 and the light sensor array 14, and is used to determine if one or both of these inputs should be enabled.

A control unit 26 receives the estimated distance between the robot 50 and the user 8 from the distance estimation unit 20 and the estimated luminance of the environmental light 12 from the luminance estimation unit 22. The control unit 26 then calculates a magnitude of motion used for controlling movement of the robot 50 using a motor 36 according to the estimated luminance of the environmental light and the estimated distance between the robot 50 and the user 8. The control unit 26 also calculates a brightness level to be emitted from a display unit 30.

The magnitude of motion is directly proportional to the estimated distance between the robot 50 and the user 8, and is also directly proportional to the estimated luminance of the environmental light 12. The reason for this is so that when the user 8 is far away from the robot 50, the robot 50 will have larger movements for allowing the user 8 to clearly see the movement of the robot 50 from far away. In addition, in one embodiment, if the estimated luminance of the environmental light 12 is low, meaning the room is very dark, having the robot 50 make excessive movements will be less useful since the user 8 will not be able to see it. Therefore, the brighter that the environmental light 12 is, the more movement the robot 50 will make. However, in other embodiments, different settings may apply to the robot 50 of present invention. For instance, a threshold is set, and if the estimated luminance of the environmental light 12 is greater than the threshold, the more movements the robot 50 will make when the darker the environmental light 12 is; if the estimated luminance of the environmental light 12 is lower than the threshold, the less movements the robot 50 will make when the darker the environmental light 12 is.

After the control unit 26 has calculated the magnitude of motion according to the estimated luminance of the environmental light and/or the estimated distance between the robot 50 and the user 8, the control unit 26 sends the calculated magnitude of motion to a motor drive circuit 34. The motor drive circuit 34 then drives the motor 36 to move with a degree of movement indicated by the magnitude of motion.

The brightness level that the control unit 26 calculates is directly proportional to the estimated distance between the robot 50 and the user 8, and is inversely proportional to the estimated luminance of the environmental light 12. Thus, the farther the user 8 is from the robot 50, the brighter the light emitting from the display unit 30 will be so that the user 8 can see the display unit 30 more clearly from far distances. On the other hand, the less luminance provided by the environmental light 12, the brighter the light emitting from the display unit 30 should be such that the user can see the display unit 30 in the dark. After the control unit 26 has calculated the brightness level according to the estimated luminance of the environmental light and the estimated distance between the robot 50 and the user 8, the control unit 26 sends the calculated brightness level to a display drive circuit 28. The display drive circuit 28 then drives the display unit 30 to emit light with a level indicated by the calculated brightness level.

As shown above, the control system 5 saves power by controlling the level of movement performed by the motor 36 and by controlling the brightness level of light emitted from the display unit 30. Besides the distance between the user 8 and the robot 50 and the luminance of environmental light 12, other factors can also be used as inputs for the robot 50 to self control the magnitude of motion of the motor 36 and the brightness level of light emitted from the display unit 30. For instance, the temperature and the humidity of the air around the robot 50 can also be used for controlling the actions of the robot 50.

Figure 3:
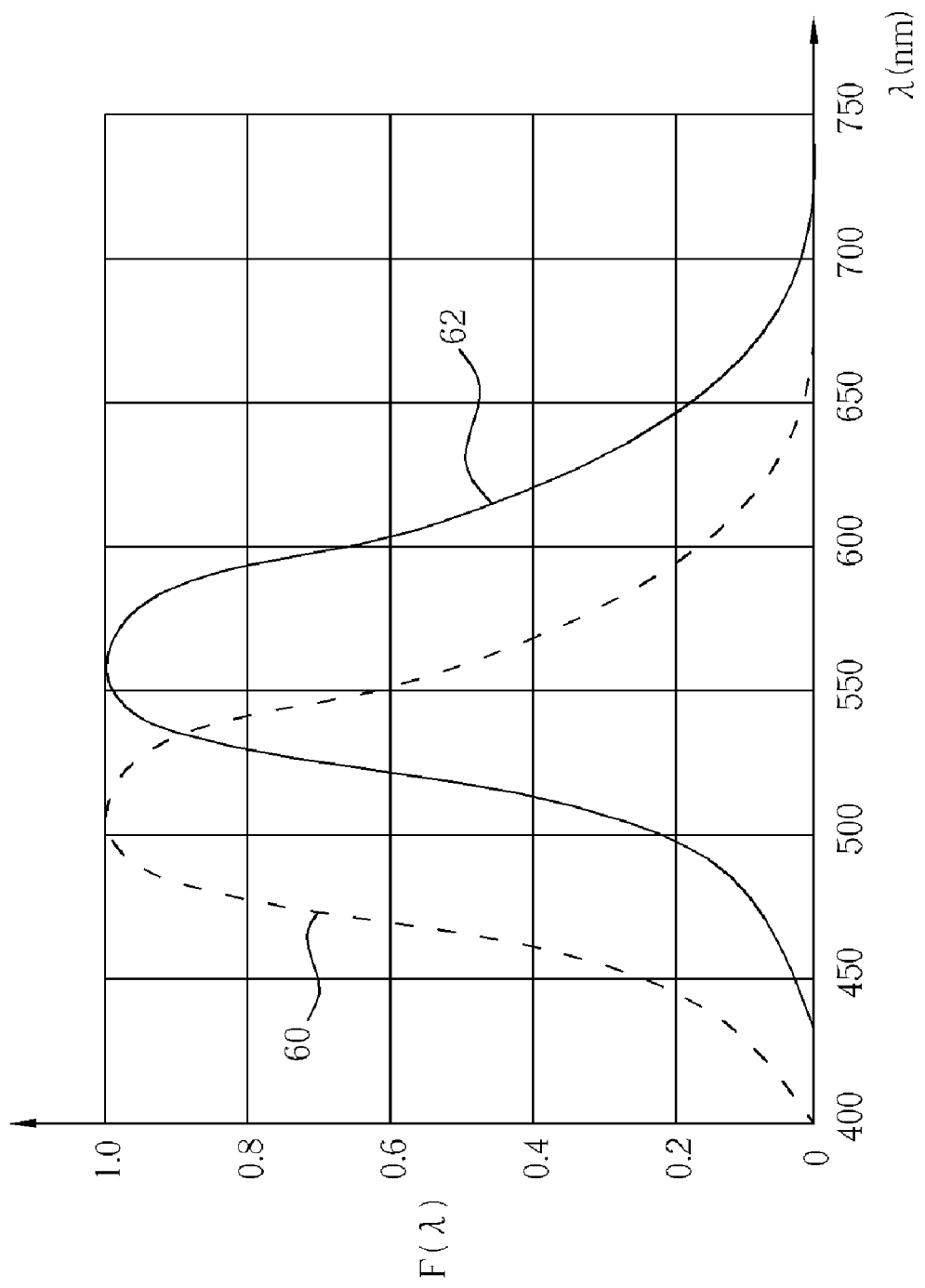
FIG. 3 is a graph showing the different color responses of human eyes during daytime and nighttime conditions.

Please refer to FIG. 1 and FIG. 3. FIG. 3 is a graph showing the different color responses of human eyes during daytime and nighttime conditions. The horizontal axis shows the wavelength $\lambda$ of the visible light spectrum, and the vertical axis shows the luminous flux radiated from a source that is visible by humans as a function of the wavelength $F(\lambda)$. Plot 60 on the graph shows the nighttime color response of human eyes, and indicates that human eyes are most sensitive to light having a wavelength of about 510 nm. This wavelength corresponds to green light. Plot 62, on the other hand, shows the daytime color response of human eyes, and shows that human eyes are most sensitive to light having a wavelength of about 555 nm. This wavelength corresponds to yellow-green light.

By using this knowledge about the color response of human eyes, a clock 24 can be used in the control system 5 for providing the control unit 26 with data indicating the time of day. Depending on the current time of day, the control unit 26 can instruct the display drive circuit 28 to drive the display unit 30 to emit light of different wavelengths. In this way, the user 8 can have the best chance of being able to view the display unit 30. Furthermore, if the user 8 is able to see the display unit 30 better, then the display drive unit 28 does not have to drive the display unit 30 to be as bright, and can thereby save power.

In summary, the present invention provides a method for controlling the actions and expression of a robot or other controllable machine according to the luminance of environmental light and the distance between the robot and the user. By using the present invention, the power consumption of the robot can be reduced considerably, and the user can also better see the status of the robot.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A machine comprising:
   a display unit;
   a sensor module for sensing a condition of the environment around the machine;
   an estimation unit for estimating an environmental condition according to the condition detected by the sensor;
   a control unit for calculating a first driving condition capable of making a user observe the machine under a first environmental condition, wherein once the estimated environmental condition changes from the first environmental condition to a second environmental condition and the control unit judges that the user is unable to clearly observe the machine with the first driving condition under the second environmental condition, the control unit dynamically adjusts the first driving condition to a second driving condition; and
   a display drive circuit for driving the display unit to emit light at the first driving condition under the first environmental condition and emit light at the second driving condition under the second environmental condition.

2. The machine of claim 1, wherein the sensor module comprises a light sensor for measuring an environmental light as the condition, and the estimation unit comprises a luminance estimation unit for estimating a luminance of the environmental light to be the environmental condition.

3. The machine of claim 2, wherein the first and second driving conditions comprise brightness level of light and the brightness level is inversely proportional to the estimated luminance of the environmental light.

4. The machine of claim 1, wherein the environmental condition comprises time of day and the first and second driving conditions comprise wavelengths of light emitted from the display unit according to the time of day.

5. The machine of claim 4, wherein the sensor module comprises a clock for providing the estimation unit with data specifying the time of day, wherein the control unit controls a display drive circuit to alter the wavelengths of light emitted from the display unit according to the time of day.

6. The machine of claim 1, wherein the estimation unit comprises a distance estimating unit for estimating a distance between the machine and the user to be the environmental condition; wherein the control unit calculates the first and second driving conditions according to the estimated distance between the machine and the user.

7. The machine of claim 6, wherein the first and second driving conditions comprise brightness level of light and the brightness level is directly proportional to the estimated distance between the machine and the user.

* * * * *